(No Model.)
J. W. COOPER.
COTTON SEED CRUSHER AND DISTRIBUTER.
No. 574,882. Patented Jan. 12, 1897.
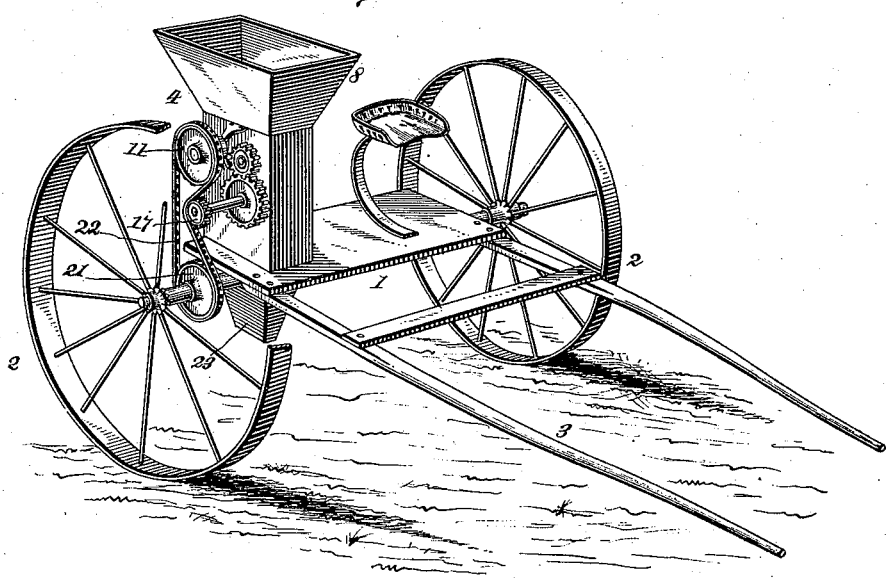
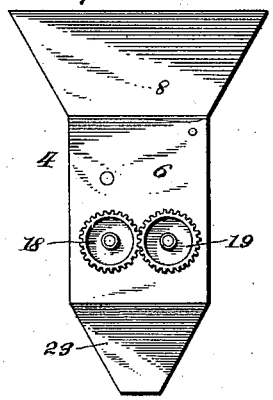
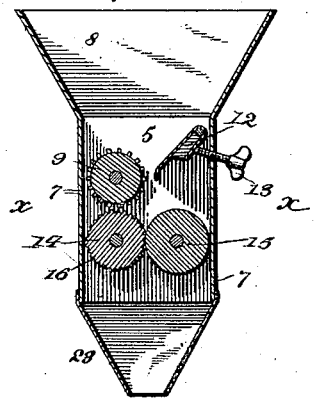
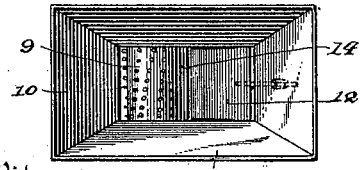
Witnesses
Theo. J. Gatchel.
L. M. Graves.
Inventor,
James W. Cooper,
by John Wedderburn
Attorney

UNITED STATES PATENT OFFICE.

JAMES W. COOPER, OF MAYESVILLE, SOUTH CAROLINA.

COTTON-SEED CRUSHER AND DISTRIBUTER.

SPECIFICATION forming part of Letters Patent No. 574,882, dated January 12, 1897.

Application filed July 17, 1896. Serial No. 599,507. (No model.)

*To all whom it may concern:*

Be it known that I, JAMES W. COOPER, a citizen of the United States, residing at Mayesville, in the county of Sumter and State of South Carolina, have invented certain new and useful Improvements in Cotton-Seed Crushers and Distributers; and I do hereby declare the following to be a full, clear, and exact description of the invention, such as will enable others skilled in the art to which it appertains to make and use the same.

My invention relates to certain new and useful improvements in cotton-seed crushers and distributers.

In the southern sections of this country cotton-seed is largely used as fertilizer, but some means must be provided for so treating said cotton-seed that it will not germinate when it is distributed on the ground as a fertilizer. By my invention I have provided means for crushing the seed, which serves to prevent its germinating, and also means for distributing the seed after it is crushed.

The invention consists of a casing mounted upon a suitable wheeled truck having shafts or other draft appliances, a hopper upon the upper end of said casing, a feed-roller mounted to rotate on the inside of said casing, a pair of crushing-rolls suitably geared together so that they will operate in unison and in opposite directions, and means for transmitting power from the axle of the wheels of the truck on which the casing is mounted for rotating said feed-roller and said crushing-rolls.

The invention also consists in other details of construction and combinations of parts, which will be hereinafter more fully described and claimed.

In the drawings forming part of this specification, Figure 1 represents a perspective view of my device. Fig. 2 is an elevation of the hopper, showing the opposite side to that which is shown in Fig. 1. Fig. 3 is a top plan view with the hopper removed. Fig. 4 is a vertical longitudinal section. Fig. 5 is a horizontal section taken on a line between the feed-roller and the crushing-rolls.

Like reference-numerals indicate like parts in the different views.

My improved device is mounted upon a truck 1, having wheels 2 and shafts or other draft appliances 3. The same is made up of a casing 4, preferably rectangular in cross-section, having the side pieces 5 6 and end pieces 7 7. Secured to the upper end of the casing 4 is a feed-hopper 8, of ordinary form of construction. Mounted to rotate on the inside of the casing 4 is a feed-roller 9, having teeth or projections 10 10 upon its outer surface and having a sprocket-wheel 11 upon the shaft on which the same is mounted. Pivoted to the side pieces 5 and 6 of the casing 4 is an inclined feed-chute 12, which is held at the proper angle by means of an adjusting screw or bolt 13, projecting through one of the end pieces 7 and engaging the under side of said chute. The lower end of the chute 12 lies a short distance from the surface of the feed-roller 9, permitting the passage of the cotton-seed between it and said roller. The size of the opening left may be regulated by screwing the bolt 13 inwardly or outwardly.

Mounted in suitable bearings at the lower end of the casing 4 are two parallel horizontally-disposed crushing-rolls 14 15, the roll 14 being grooved or corrugated upon its outer surface, forming crushing-teeth 16, and the roll 15 may, if desired, be formed with similar teeth to those on the surface of the roll 14. The said rolls are mounted upon suitable shafts having bearings in the side pieces 5 and 6, and the shaft of the roll 14 has upon one end a sprocket-wheel 17 and upon its other end a cog-wheel or pinion 18, which meshes with a similar pinion 19 upon the shaft on which the roll 15 is mounted. By this construction it will be seen that the rotation of the crushing-roll 14 in one direction will cause the rotation of the roll 15 in the opposite direction.

Secured to the hub 20 of the wheel 2 is a sprocket-wheel 21, around which passes a sprocket-chain 22, which meshes with the sprocket-wheels 11 and 17, as clearly shown. The lower end of the casing 4 is open and is provided with a discharge-spout 23, having inclined sides for the purpose of discharging the crushed cotton-seed in furrows along the ground.

The operation of my device is as follows: The feed-hopper 8 is filled with cotton-seed, which is adapted to fall down upon the chute 12 and be discharged between the lower end thereof and the feed-roller 9 upon the crushing-rolls 14 and 15. Upon the forward movement of the truck the rotation of the wheels 2 will cause, through the gearing between the axle of said wheels and the sprocket-wheels 11 and 17 a rotation of the feed-roller 9 and the crushing-roll 14. When this takes place, the cotton-seed is fed in small regulated quantities by the feed-roller 9 upon the upper surface of the crushing-rolls 14 and 15, the latter being rotated in opposite directions, bringing the teeth 16 thereon into contact with each separate seed, thoroughly crushing the same and destroying its power of germinating. After the seed has been crushed it is fed automatically through the discharge-spout 23 upon the ground, where it serves as a perfect fertilizer.

Having now described my invention, what I claim as new, and desire to secure by Letters Patent, is—

In a device of the character set forth, the combination with a truck mounted upon wheels having suitable draft appliances attached thereto, of a cotton-seed crusher and distributer secured to said truck, the same consisting of a casing open at its upper and lower ends, a hopper secured to the upper end of said casing and discharging thereinto, a feed-roller mounted to rotate in said casing having teeth or projections thereon, a sprocket-wheel upon the outer end of the shaft on which said feed-roller is mounted, a feed-chute pivoted to the inside of said casing whose lower end is separated a slight distance from the surface of said feed-roller, an adjusting-screw for said chute, a pair of crushing-rolls mounted upon suitable shafts at the lower end of said casing one of said rolls having a smooth outer surface, and the other having grooves or corrugations thereon forming crushing-teeth, intergearing cog-wheels upon the outer ends of the shafts upon which said crushing-rolls are mounted, a sprocket-wheel upon the opposite end of the shaft of one of said rollers, a sprocket-wheel on the hub of one of the wheels of said truck, and a sprocket-chain passing around said sprocket-wheel and the sprocket-wheels on said crushing and feed rollers, substantially as and for the purpose described.

In testimony whereof I have signed this specification in the presence of two subscribing witnesses.

JAMES W. COOPER.

Witnesses:
D. C. DE SCHAMPS,
C. D. COOPER.